March 28, 1967 L. PERAS 3,311,786
DETECTION AND CONTROL ELECTRONIC CIRCUIT FOR CIRCUIT BREAKING
Filed April 6, 1964 2 Sheets-Sheet 1
Fig. 1
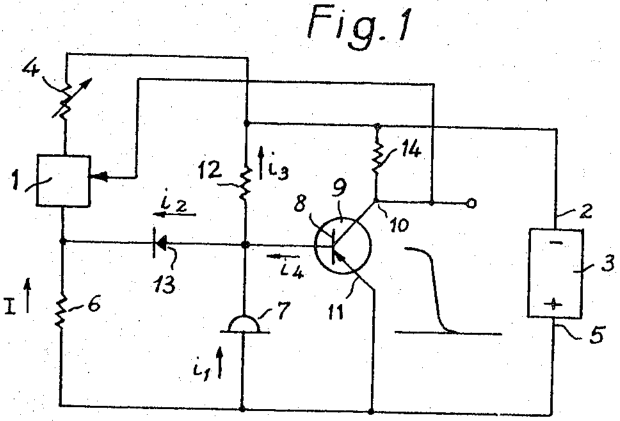
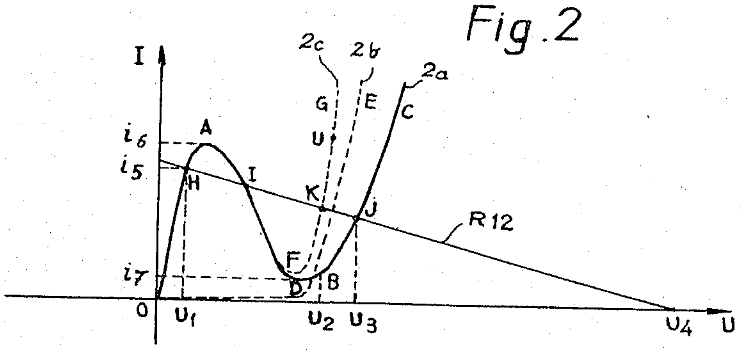
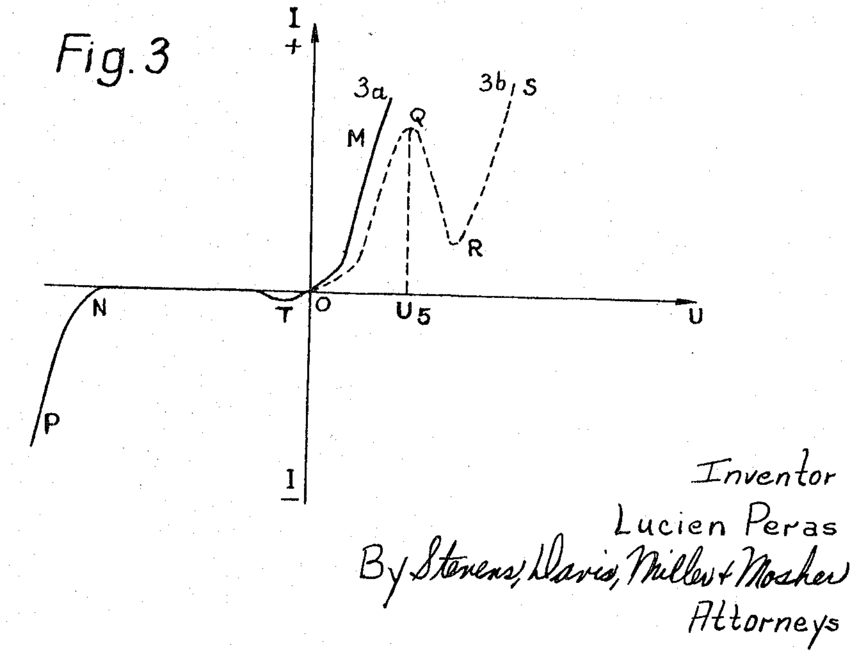
Inventor
Lucien Peras
By Stevens, Davis, Miller & Mosher
Attorneys March 28, 1967 L. PERAS 3,311,786

DETECTION AND CONTROL ELECTRONIC CIRCUIT FOR CIRCUIT BREAKING

Filed April 6, 1964 2 Sheets-Sheet 2

Inventor
Lucien Peras
By Stevens, Davis, Miller & Mosher
Attorneys

United States Patent Office 3,311,786

Patented Mar. 28, 1967

3,311,786

DETECTION AND CONTROL ELECTRONIC CIRCUIT FOR CIRCUIT BREAKING

Lucien Peras, Billancourt, France, assignor to Regie Nationale des Usines Renault, Billancourt, France, a French works Filed Apr. 6, 1964, Ser. No. 357,535
Claims priority, application France, Apr. 10, 1963, 931,166, Patent 1,361,501
11 Claims. (Cl. 317—33)

In industrial applications of semiconductors and especially in mobile applications thereof, it is useful to provide an auto-reclose circuit-breaker for cutting out a transistor or, more generally, for holding the element to be protected in the non-conductive state in the event of the current and voltage ratings being exceeded.

The present invention relates to a circuit-breaker of this type which comprises an information resistor inserted into the circuit to be protected, a tunnel diode connected in parallel with the base/emitter junction of a transistor controlling a cutoff device on said circuit to be protected, connecting means between said circuit to be protected and said parallel connection holding said means in the tripped position, means for varying the tripping current in relation with the supply voltage and means for limiting the voltage with load current and, in a preferred form of embodiment, positive feedback means between the input circuit comprising the tunnel diode and the transistor, and the circuit to be cut off.

The tunned diode/transistor association will hereinafter be referred to as the "hybrid circuit." Such an association has become well known per se through technical literature and does not in itself fall within the scope of the present invention. This hybrid circuit constitutes one of the elements of the inventive apparatus and is capable of assuming the function of a maximum current or voltage circuit breaker.

The description which follows with reference to the accompanying non-limitative exemplary drawings will give a clear understanding of how the invention can be carried into practice.

In the drawings:

FIGURE 1 is a schematic diagram of the input circuit of a circuit-breaker according to the invention;

FIGURE 2 is the characteristic current curve plotted against the voltage of the tunnel diode and transistor used in FIGURE 1 for constituting the hybrid circuit, said tunnel diode revealing a current peak in the forward-bias region at low applied voltages;

Figure 4:
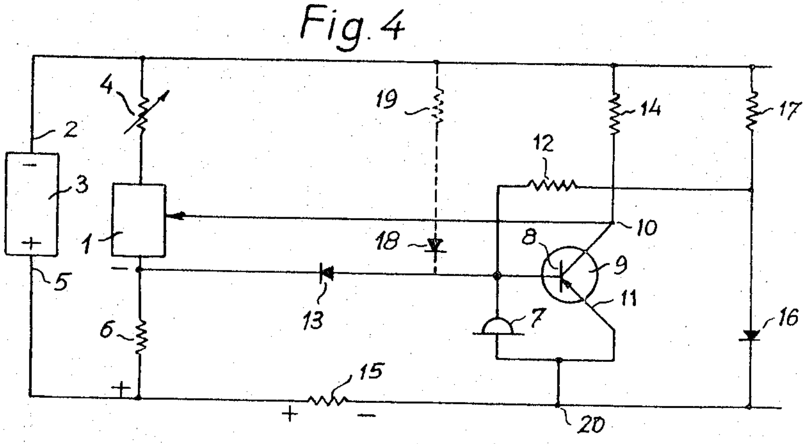
Figure 5:
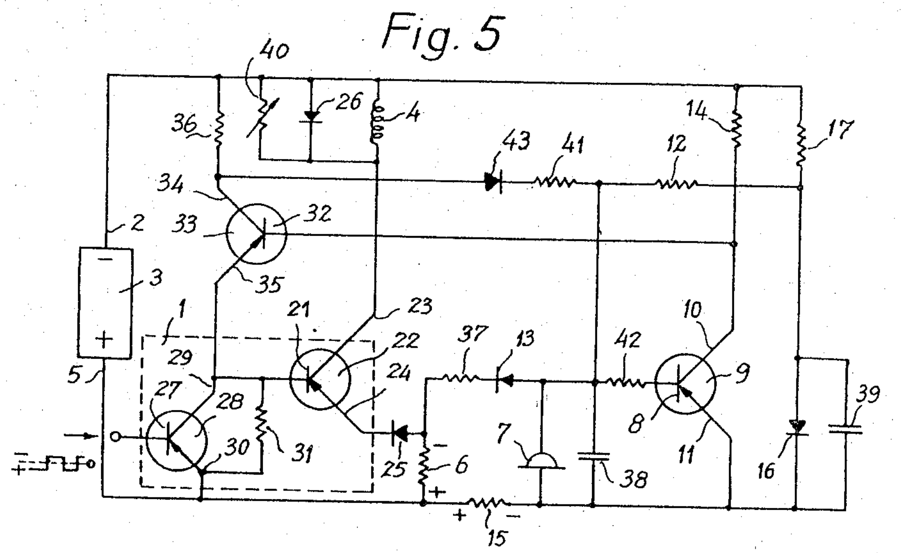
Figure 6:
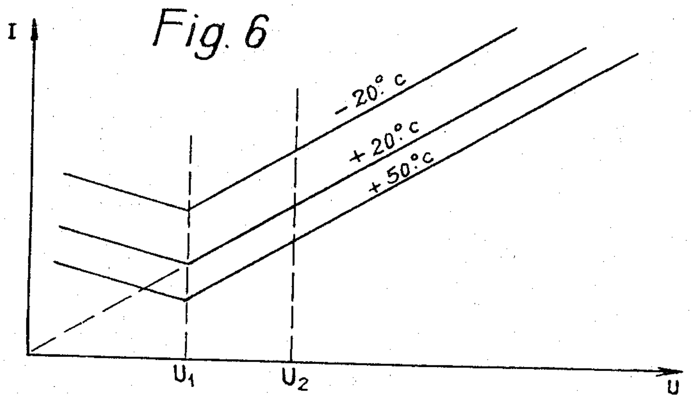

FIGURE 3, curve $3a$ is a similar characteristic curve of a so-called back tunnel diode used as a connecting means between the information resistor and the forward-current-peak tunnel diode, the current peak being in this case of low value and located in the back voltage region;

FIGURE 4 is an alternative arrangement to that of FIGURE 1, for reducing the sensitivity of the circuit-breaker at higher supply voltages and, if necessary, for causing tripping above a specified voltage, irrespective of current intensity;

FIGURE 5 is an example of application of the diagram of FIGURE 1 to the load circuit of electronic control means of an electric clutch for motor vehicles, a feedback circuit being included to improve reliability, and FIGURE 6 is a plot of tripping current against feed voltage in the circuit diagram of FIGURE 5, for three different ambient temperatures.

Reference to FIGURE 1 shows an electrical cutoff device 1 connected on the one hand to the negative pole 2 of a power supply source 3 through a load impedance 4 and, on the other, to the positive pole 5 of said source through a resistor of low rating 6 constituting the circuit-breaker information resistor.

The anode of tunnel diode 7 providing a current peak in its forward-bias region is connected to the positive pole 5 of said source and its cathode to three different elements, to wit: the base 8 of a p-n-p transistor 9, a resistor 12 leading back to the negative pole 2, and a negative-bias tunnel diode 13 leading to the junction point between the device 1 and resistor 6. The transistor emitter 11 is connected to positive pole 5 and to the anode of diode 7, while the collector 10 of said transistor leads back to the negative pole 2 through a load resistor 14 whose rating is relatively high relative to the output capability of the transistor.

The solid-line curve $2a$ of FIGURE 2 is the characteristic curve of the current through the tunnel diode 7 alone, plotted against the voltage applied thereto. As the forward voltage increases from the origin onwards, the current increases rapidly over the tunnel diode region OA. If the voltage increases further, the current drops over the region AB, then increases anew over the region BC without any limitation other than the power dissipated.

The dotted line $2b$ is the characteristic curve of the current in the base 8 of the transistor 9 alone, plotted against the forward voltage applied (emitter-base). Over the region OD the base current is very low and does not produce any substantial current in the collector 10. Over the region DE, the base current increases very rapidly with the voltage applied. This region DE corresponds substantially, for a germanium tunnel diode 7 and transistor 9, to the trough in the characteristic curve ABC of the tunnel diode under the usual temperature conditions.

The rating of resistor 12 is such that it causes a current $i_3$ to flow through the tunnel diode 7 that is substantially less than the current $i_6$ corresponding to the current peak at the point A and greater than the current $i_7$ corresponding to the trough B. If the load line R12 corresponding to the resistor 12 is drawn from the voltage U4 of the power supply source, this line will intersect the tunnel diode characteristic curve OABC at three points H, I, J. Since, however, the base-emitter junction 8/11 of the transistor is parallel-connected to the tunnel diode 7 in the circuit diagram of FIGURE 1, the resultant characteristic curve FG of the sum of the base current and the tunnel diode current in the relevant region has also been drawn.

The characteristic curve FG is intersected at K by the load line. The only stable operating points will be H or K, depending on the prior condition of the circuit.

In FIGURE 3, the curve $3a$ is the current characteristic of the diode 13 alone, plotted against the applied voltage. Over the forward-bias region OM the diode is highly conductive at low voltages. In the negative-bias region OTN, the diode is but very slightly conductive, except for a small peak at T. At higher negative voltages the current increases over the region NP.

The broken-line curve $3b$ is the current characteristic OQRS for the diode 13 connected into the circuit of FIGURE 1, when the voltage across the terminals of resistor 6 increases, i.e. when the current through the device 1 increases, it being assumed that the action of the circuit-breaker is eliminated and resistor 12 disconnected, hence devoid of current $i_3$.

Operation will now be briefly described with reference to FIGURES 1, 2 and 3.

Assuming the cutoff device 1 to be inoperative due to a cause independent of the circuit under consideration, no current will flow through the load impedance 4 or the resistor 6.

Resistor 12 causes the tunnel diode to be the seat of a current $i_1$ having a value $i_5$ corresponding to the point H in FIGURE 2 whereat the transistor 9 is non-conductive.

When the cutoff device 1 becomes operative and supposing that an incident occurs which makes the load resistance 4 drop (such as a short circuit or the like), the current in the resistance 6 will increase and the potential at the output of the resistance 6 will fall; an extra current $i_2$ will flow through diode 13 and increase $i_1$ thereby shifting the point H towards the point A corresponding to the value $i_6$ of the current $i_1$, namely at the voltage U5 (FIGURE 3) across the terminals of resistor 6.

The operating point of the hybrid circuit shifts to the point U (FIGURE 2) whereat transistor 9 is conductive, thus producing a collector current and a drop in the collector-emitter potential, and this variation is applied to the device 1 and renders it non-conductive. The voltage across the terminals of resistor 6 vanishes and the operating point of the hybrid circuit reverts to K on the load line, the diode 13 being henceforth biased in the non-conductive sense over the region ON.

The negative-bias tunnel diode 13 may be replaced by a diode of any convenient type, but in that case both the voltage drop in the forward sense and the voltage required across the resistor terminals to ensure tripping will be much greater.

The diode 13 may even be replaced by an ordinary resistor which would have to be of sufficiently high rating not to deviate, subsequent to tripping, too large a fraction of the current normally earmarked for holding the operating point of the hybrid circuit at the point K of FIGURE 2.

The device 1 can be of any known type, examples being an electromagnetic relay, a vacuum tube, a two-junction transistor, a three-junction controlled make-and-break switch, and so forth.

FIGURE 4 is a circuit diagram of an alternative arrangement to FIGURE 1, enabling the circuit-breaker sensitivity to be automatically adjusted to the feed voltage. A low-rating resistor 15 is connected between the mutual point 20 of the tunnel diode anode and the emitter 11 of transistor 9 on the one hand, and the battery positive pole 5, on the other, which pole remains connected directly to the information resistor 6. A Zener diode 16 connects the point 20 to the negative pole 2 through a limiting resistor 17. In operation, the current through the resistor 15 increases rapidly with the feed voltage once the Zener diode characteristic bend has been exceeded, thereby producing across the terminals of said resistor a voltage which increases with the feed voltage. This potential drop across resistor 15 is, in reference to the hybrid circuit, opposed to that developed across the terminal of information resistor 6 on the base 8 of the transistor. One can see that the potentials developed across the resistors 6 and 15 are in opposition and subtract from each other and thus make the sensitivity inversely proportional to the feed voltage.

In contrast to the circuitry of FIGURE 1, in this case the resistor 12 supplying the hybrid circuit holding current leads back not to the negative pole 2 but to the mutual point between resistor 17 and Zener diode 16. The adverse effect on current stability in the resistor 12 due to the presence of resistor R15 is only infinitesimal, since the voltage developed across the terminals of resistor R15 is usually negligible in comparison with the reference voltage of Zener diode 16. The applicant was successful in obtaining the desired result in a practical embodiment using R15=1 ohm and R17=50 ohms.

An auxiliary Zener diode 18 connected, on the one hand, to the base 8 and the tunnel diode cathode and, on the other, to the negative pole 2 through a limiting resistor 19 would make it possible, if necessary, to obtain tripping beyond a specified feed voltage, irrespective of the current passing through the information resistor 1.

In accordance with an alternative form of embodiment (not shown), it would be possible to obtain a tripping current intensity that decreases as the feed voltage increases, by placing the compensating resistor 15 between the diode 13 and the mutual point of device 1 and resistor 6, the Zener diode cathode being led back to the junction point between diode 13 and resistor 15. In this case, the potentials developed across the resistors 6 and 15 add to each other so that the transistor will be conductive for a lower potential drop in resistor 6 than it would be in the case without resistor 15.

FIGURE 5 is illustrative of an application to the power stage of a system for energizing an electric clutch on a motor vehicle, which application is based on the component parts of FIGURE 4.

The clutch coil 4 is energized by the current source 3 through the collector 23/emitter 24 circuit of a p-n-p power transistor 22, a power diode 25, and the information resistor 6, these various components being connected in that order from the negative pole 2 to the positive pole 5 of said current source. Transistor 22 is part of the electronic clutch supply system 1, in conjunction with a further transistor 28 from which it receives clutch operating information. Across the terminals of the clutch coil 4 is a protective diode 26. Possible variations in the coil 4 due to short circuits or insulation flaws are figuratively represented by a parallel-connected resistor 40.

The base 21 of transistor 22 is connected to the collector 29 of transistor 28, to the pole 5 through a leakage resistor 31 and to the emitter 35 of a supplementary transistor 33 receiving commands from the transistor 9 whose collector 10 is connected to the base 32 of transistor 33. The collector 34 of transistor 33 is connected to the negative pole 2 of the current source through a resistor 36 which is the base-biasing resistor of power transistor 22.

The emitter 30 of transistor 28 is connected to the positive pole 5 of the source, the clutch operating commands being applied to the base 27 in the form of a variety of signals which are not included within the scope of the present invention but which may be summarized in the form of rectangular signals which are positively biased relative to the emitter when there is a current flow command through the coil 4, a negative bias being applied at all other times.

The transistors are all of the p-n-p type, including the transistors 22 and 28 of the clutch control system and the transistors 9 and 33 forming part of the circuit breaker.

The circuit-breaker hybrid circuit is laid out in the same way and with the component parts as in FIGURE 4, except for the provision of a protection resistor 37 for the negative-bias diode 13, of a time-delaying capacitor 38 parallel-connected to the tunnel diode, of a resistor 42 ranging from a few tenths of an ohm to a few ohms, series-connected to the base 8, and of a time-delay capacitor 39 parallel-connected to the Zener diode 16, the purpose of these several components being to ensure functional stability in operation and, more particularly, insensitivity to the energy radiated by the engine ignition system.

A further Zener diode 43 having a limiting resistor 41 in series therewith is additionally connected across the collector 34 of transistor 33 and the cathode of tunnel diode 7 to introduce feedback energy between the input and the output of the system. The Zener potential is so chosen that when the transistor 33 is conductive no current flows through said Zener diode.

The manner of operation of the system will now be briefly described hereinbelow:

When a negative signal is applied to the base 27 of transistor 28, the voltage across collector 29 and emitter 30 becomes very small and inadequate to bias the base 21 of transistor 22, so that no current can flow through the clutch and protection thus becomes unnecessary.

When, on the contrary, the base 27 of transistor 28 is not positively biased by the clutch control signal, the transistor 22 is rendered conductive through the current of its base 21 flowing through the emitter 35/collector 34 circuit of transistor 33 and through resistor 36. For transistor 33 is in fact itself conductive, its base 32 being biased by the resistor 14 when transistor 9 is not conductive, i.e. when the current through the resistor 6 does not exceed the specified value.

The load of collector 23 comprises the coil 4 and the resistor 40, and should the total current therein exceed the specified value the voltage produced across the terminals of information resistor 6 triggers the hybrid circuit, whereupon the voltage across collector 10 and emitter 11 of transistor 9 becomes very low and transistor 32 ceases to be conductive since it is no longer biased or may even be counter-biased due to the voltage thresholds existing in its emitter 35. As a result, transistor 22 ceases to be conductive and tripping takes place due to the fact that the resistance across collector 34 and emitter 35 of transistor 33 has become very high.

The potential of collector 34 tends to become identical with that of negative pole 2. As a result, the Zener potential of diode 43 is exceeded and extra current is applied to the hybrid circuit through resistor 41. The operating point of the hybrid circuit is higher than the point U in FIGURE 2, corresponding to a higher current in the base of transistor 9 than when there is no feedback. Subsequent to tripping, the operating point remains higher than the point K.

FIGURE 6 plots the tripping current I against the voltage of source 3 for three different temperatures, namely −20° C., +20° C., and +50° C. It may be seen that above a voltage U1 corresponding to the Zener threshold of diode 16—which is preferably chosen equal to the minimum possible supply voltage—the tripping current increases with increasing supply voltage. By merely modifying the resistor 15 it is possible to obtain characteristic curves which do or do not pass through the origin of the over- or under-compensated coordinates. Using germanium diodes 13 and 7 and a voltage for diode 7 of some 50 to 60 millivolts at peak current, the sensitivity can be adapted to the temperature coefficient of the copper used for coil 4, with a satisfactory degree of accuracy without recourse to an auxiliary device. In a practical embodiment, it was found that a potential of 0.17 volt was required across the terminals of resistor 6 to obtain tripping at a temperature of 20° C.

The specific example of application shown in FIGURE 5 enables the current in transistor 22 to be completely suppressed for all practical purposes, but is capable of giving the extremely short tripping times that can be obtained with the tunnel diode circuit only provided it is possible to avoid the causes of delay, these being mainly the accumulation of carriers in the junctions of the transistors which operate at saturation level and the capacitor paralleled across the tunnel diode.

For high speed applications it would be preferable to resort to the customary techniques utilizing non-saturated circuits, small leakage resistance, and so on.

The circuits formed with p-n-p transistors can be formed, by respecting the different polarities, with n-p-n transistors.

I claim:

1. An overload circuit breaker, comprising a tunnel diode producing a current peak in its forward bias characteristics, a transistor whose base and emitter are connected in parallel with said tunnel diode forming a hybrid circuit; at least one low-rating resistor series connected to a circuit to be protected and picking up information relating to current intensity, connecting means constituted by a complex resistance, such as a negative bias tunnel diode, for leading voltage developed across terminals of the information resistance to said hybrid circuit, means for cutting out said circuit to be protected, said cutout means being controlled by the transistor associated with said tunnel diode, another resistance disposed between the output of the hybrid circuit and one side of a source of current, the other side of said source being connected to the other side of the hybrid circuit, said source furnishing a voltage which is high in comparison with the voltage required to bias the base of said transistor, whereby an auxiliary current is fed through said hybrid circuit and mathematically combines with the current issuing from said information resistance, so that a cutout condition is sustained subsequent to tripping by said auxiliary current.

2. A circuit-breaker as claimed in claim 1, further comprising a positive feedback circuit connecting said tunnel diode to said cut-out means the effect of which is to increase the current in the base of said transistor during and after tripping, the rapidity of said tripping being thereby increased.

3. A circuit-breaker as claimed in claim 2, in which a Zener diode is inserted into the feedback circuit and interrupts the flow into said tunnel diode of unwanted currents outside the tripping phases.

4. A circuit-breaker as claimed in claim 1, in which at least one of the connecting means between said information resistor and said hybrid circuit is a diode and more specifically a tunnel diode of high forward conductivity and low reverse conductivity, in which latter sense it produces only a small current peak, said diode being crossed in the forward sense prior to tripping taking place and thereby enabling tripping to be obtained with small voltages across the terminals of said information resistor, yet opposing, subsequent to tripping, the flow of a substantial back current toward said information resistor.

5. A circuit-breaker as claimed in claim 1, wherein said element is a Zener diode series-connected to said correction resistor to stabilize said auxiliary current, said tunnel diode and its series-connected resistor for supplying auxiliary current being parallel-connected to said Zener diode.

6. A circuit-breaker as claimed in claim 1, in which the collector of the transistor of said hybrid circuit is connected to the base of a second transistor placed as a series switch in the circuit for biasing the base of a power transistor which with its load resistor comprises the circuit to be protected.

7. A circuit-breaker as claimed in claim 1, in which the feedback circuit is connected to the collector of the transistor series-connected to the base of said power transistor.

8. A circuit-breaker as claimed in claim 1, further comprising a time-delay capacitor connected across the tunnel diode terminals to prevent accidental tripping due to surges and external fields.

9. A circuit-breaker as claimed in claim 3, further comprising a time-delay capacitor parallel-connected to the Zener diode of said feedback circuit to retard tripping of the circuit-breaker when the circuit is energized by the power supply.

10. A circuit-breaker as claimed in claim 1, further comprising an auxiliary Zener diode connected between the base of said hybrid circuit transistor and that pole of the power supply source to which the collector of said transistor is connected through its load resistor, to thereby obtain tripping above a specified supply voltage irrespective of the current flowing through said information resistor.

11. An overload circuit breaker as claimed in claim 1 wherein said connecting means between said information resistor and said hybrid circuit comprises a resistor whose object is the correction of the tripping current intensity according to changes in the feed voltage, said correction resistor being connected with one terminal in series with said power source and its other terminal with an element having non-linear responsive to voltage, said element being connected with the other side of the power source, the potential developed across the terminals of said correction resistor being mathematically combined with that developed in said information resistor accordingly as said correction resistor is selectively inserted into a connecting branch to said element.

References Cited by the Examiner

UNITED STATES PATENTS

| | | | |
|---|---|---|---|
| 3,173,078 | 3/1965 | Farnsworth | 317—33 X |
| 3,201,613 | 8/1965 | Amodei | 307—88.5 |
| 3,214,608 | 10/1965 | Mollinga | 307—88.5 |
| 3,218,542 | 11/1965 | Taylor. | |

OTHER REFERENCES

General Electric Silicon Controlled Rectifier Manual, pgs. 98–99; 1961; Rectifier Components Dept., Auburn, New York.

General Electric Tunnel Diode Manual, pg. 49; 1961, Semiconductor Products Dept., Kelly Building, Liverpool, New York.

MILTON O. HIRSHFIELD, *Primary Examiner.*

R. V. LUPO, *Assistant Examiner.*